(12) United States Patent
Lau et al.

(10) Patent No.: US 7,093,160 B2
(45) Date of Patent: Aug. 15, 2006

(54) METHOD AND SYSTEM FOR IMPLEMENTING MPLS REDUNDANCY

(75) Inventors: Chun-Hung Lau, Foster City, CA (US); Chi Fai Ho, Sunnyvale, CA (US); Vishal Murgai, San Jose, CA (US); Vandalore Bobby, Santa Clara, CA (US)

(73) Assignee: Nokia Corporation, Espoo (FI)

( * ) Notice: Subject to any disclaimer, the term of this patent is extended or adjusted under 35 U.S.C. 154(b) by 512 days.

(21) Appl. No.: 10/139,065

(22) Filed: May 3, 2002

(65) Prior Publication Data
US 2003/0046604 A1 Mar. 6, 2003

Related U.S. Application Data

(60) Provisional application No. 60/288,580, filed on May 3, 2001.

(51) Int. Cl.
*G06F 11/00* (2006.01)
(52) U.S. Cl. .......................................... 714/11; 370/219
(58) Field of Classification Search ............ 714/11–13, 714/4; 370/219, 216, 227–228, 220, 351, 370/400; 709/238–242
See application file for complete search history.

(56) References Cited

U.S. PATENT DOCUMENTS

| | | | |
|---|---|---|---|
| 5,202,834 A | 4/1993 | Gilham | |
| 5,539,881 A | 7/1996 | Hunt et al. | |
| 5,574,718 A | 11/1996 | Eckhoff et al. | |
| 5,959,972 A | 9/1999 | Hamami | |
| 5,964,841 A | 10/1999 | Rekhter | |
| 6,049,524 A | 4/2000 | Fukushima et al. | |
| 6,097,718 A | 8/2000 | Bion | |
| 6,097,728 A | 8/2000 | Sharma et al. | |
| 6,112,248 A | 8/2000 | Maciel et al. | |
| 6,151,684 A * | 11/2000 | Alexander et al. | 714/4 |
| 6,173,324 B1 | 1/2001 | D'Souza | |
| 6,195,705 B1 | 2/2001 | Leung | |
| 6,201,810 B1 | 3/2001 | Masuda et al. | |
| 6,208,666 B1 | 3/2001 | Lawrence et al. | |
| 6,253,327 B1 | 6/2001 | Zhang et al. | |
| 6,278,687 B1 | 8/2001 | Hunneyball | |
| 6,425,005 B1 | 7/2002 | Dugan et al. | |
| 6,628,649 B1 * | 9/2003 | Raj et al. | 370/360 |
| 6,694,450 B1 * | 2/2004 | Kidder et al. | 714/15 |
| 6,775,239 B1 * | 8/2004 | Akita et al. | 370/248 |
| 6,910,148 B1 * | 6/2005 | Ho et al. | 714/4 |
| 2002/0073226 A1 * | 6/2002 | Sridhar et al. | 709/235 |
| 2002/0141429 A1 * | 10/2002 | Pegrum et al. | 370/422 |
| 2004/0156310 A1 * | 8/2004 | Fredette et al. | 370/216 |

* cited by examiner

*Primary Examiner*—Dieu-Minh Le
(74) *Attorney, Agent, or Firm*—Squire, Sanders & Dempsey L.L.P.

(57) ABSTRACT

The present invention relates to a method and system for implementing protocol redundancy in a router. In particular, the invention relates to providing redundancy of multi protocol label switching (MPLS). In one aspect, the present invention provides MPLS redundancy wherein all protocol states are mirrored. An active processor provides MPLS operations. In the present invention, a standby processor is coupled to the active processor. During the initial synchronization, all protocol information from the active processor is forwarded to the standby processor. The protocol information can include event information and state information. Thereafter, any updates of protocol information are immediately forwarded to the standby processor in an orderly and controlled manner. Upon failure of the active processor, the standby processor takes over as the active processor. All MPLS protocol operations are performed on the new active processor.

27 Claims, 3 Drawing Sheets

METHOD AND SYSTEM FOR IMPLEMENTING MPLS REDUNDANCY

This application claims of Provisional application Ser. No. 60/288,580, filed May 3, 2001.

BACKGROUND OF THE INVENTION

1. Field of the Invention

This invention relates to optical communications and more particularly to a multi-service optical communication network.

2. Description of the Related Art

While Internet Protocol ("IP") traffic will represent more than 90 percent of the total public communication network traffic by 2002 and communication service providers plan to invest more than $70 billion in core routing and optical transmission equipment to significantly expand their IP/optical backbone networks, revenues from IP services will only approach $25 billion, which represents only a third of the total communication network services revenue pool of $75 billion. This revenue dilemma is primarily the result of extensive competition in the Internet access market, which has essentially resulted in commodity, flat rate pricing. Extensive use of graphics, audio and video content has driven average utilization up significantly, yet the user is charged the same rate. Service providers must add capacity in the network core without any corresponding increase in revenue. The real challenge for service providers is how to generate more revenue from their IP/optical backbones. By taking advantage of the latest advances in IP quality of service ("QoS"), multiprotocol label switching ("MPLS"), and service transformation technology (the conversion of non-IP services to IP), service providers can evolve dedicated IP infrastructures into a multi-service network architecture, as an alternative to operating separate service-specific networks. The new network architecture is a single multi-service network using IP as the underlying protocol for all service delivery. This allows service providers to supplement IP revenues with other established network service revenues from frame relay, TDM private lines and ATM, resulting in faster payback of the tremendous carrier investment in their IP/optical networks.

However, the multi-service network architecture must have the reliability of the networks it intends to supplement or replace. Fault tolerance must start at the network edge where services converge. IP edge routers currently deployed at the edges of IP/optical networks only support IP services. These routers have roots in enterprise and are therefore not particularly fault tolerant. When IP edge routers lose their primary control circuitry and operation falls back to a redundant controller, a five- to 15-minute outage ensues while the router relearns the routing states and packet forwarding tables. Such outages, while acceptable in a simple single service IP network, are intolerable in a multi-service network architecture. Therefore there is a need for high reliability in the multi-service network.

It is desirable to provide high network availability by providing improved redundancy using a backup link level process in total real time synchronization with an active one in order to enable an expeditious switchover when a failure occurs on the active control card.

SUMMARY OF THE INVENTION

The present invention relates to a method and system for implementing protocol redundancy in a router. In particular, the invention relates to providing redundancy of multi protocol label switching (MPLS). In one aspect, the present invention provides MPLS redundancy wherein all protocol states are mirrored. An active processor provides MPLS operations. In the present invention, a standby processor is coupled to the active processor. During the initial synchronization, all protocol information from the active processor is forwarded to the standby processor. The protocol information can include event information and state information. Thereafter, any updates of protocol information are immediately forwarded to the standby processor in an orderly and controlled manner. Upon failure of the active processor, the standby processor takes over as the active processor. All MPLS protocol operations are performed on the new active processor.

In the present invention, all states of the protocol immediately function as if a failure had not occurred. Neighbor routers will not notice any difference after switch-over, and no additional information is needed from neighbor routers after the switch-over. Accordingly, the router's forwarding capability will remain unaffected.

In the present invention the standby MPLS processor stays in a highly synchronized state with the active processor, referred to as a hot-standby state. Accordingly, an expeditious switchover to the standby processor occurs when the active processor fails.

The invention will be more fully described by reference to the following drawings.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
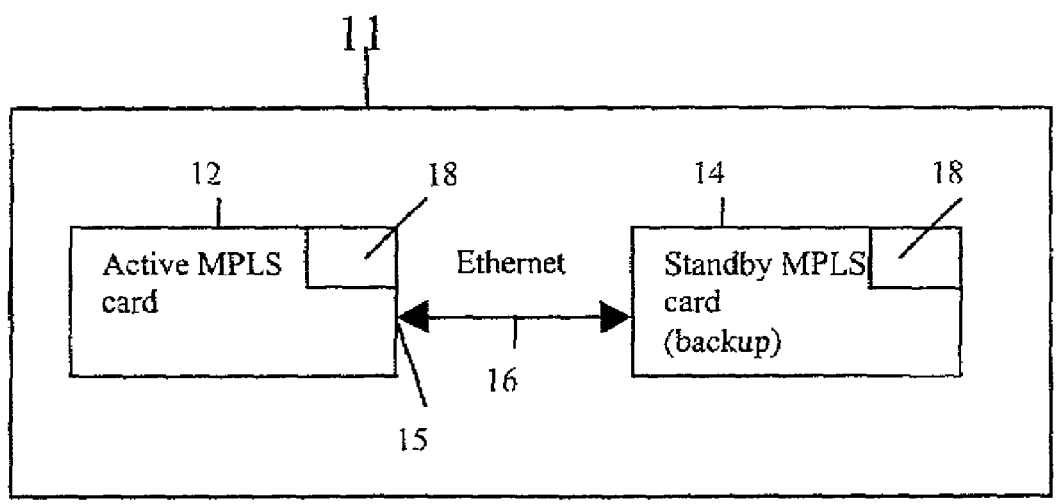
FIG. 1 is a schematic diagram of a system for implementing MPLS protocol.

Reference will now be made in greater detail to a preferred embodiment of the invention, an example of which is illustrated in the accompanying drawings. Wherever possible, the same reference numerals will be used throughout the drawings and the description to refer to the same or like parts.

MPLS (Multiprotocol Label Switching) is a standards-approved technology for speeding up network traffic flow and making it easier to manage. MPLS involves setting up a specific path for a given sequence of packets, identified by a label put in each packet, thus saving the time needed for a router to look up the address to the next node to forward the packet to. MPLS is called multiprotocol because it works with the Internet Protocol ("IP"), Asynchronous Transport Mode ("ATM"), and various frame relay network protocols. Referring to the standard Open Systems Interconnection ("OSI"), MPLS allows most packets to be forwarded at the layer 2 (switching) level rather than at the layer 3 (routing) level. In addition to moving traffic faster overall, MPLS makes it easy to manage a network for quality of service ("QoS"). For these reasons, the technique is expected to be readily adopted as networks begin to carry more and different mixtures of traffic.

While MPLS was originally a way of improving the forwarding speed of routers it is emerging as a crucial standard technology that offers new capabilities for large-scale IP networks. Traffic engineering, the ability of network operators to dictate the path that traffic takes through their network, and Virtual Private Network support are examples of two key applications where MPLS is superior to any currently available IP technology.

The essence of MPLS is the generation of a short fixed-length 'label' that acts as a shorthand representation of an IP packet's header. This is much the same way as a ZIP code is shorthand for the house, street and city in a postal address, and the use of that label to make forwarding decisions about the packet. IP packets have a field in their 'header' that contains the address to which the packet is to be routed. Traditional routed networks process this information at every router in a packet's path through the network (hop by hop routing).

In MPLS, the IP packets are 'encapsulated' with these labels by the first MPLS device they encounter as they enter the network. The MPLS edge router analyses the contents of the IP header and selects an appropriate label with which to encapsulate the packet. Part of the great power of MPLS comes from the fact that, in contrast to conventional IP routing, this analysis can be based on more than just the destination address carried in the IP header. At all the subsequent nodes within the network the MPLS label, and not the IP header, is used to make the forwarding decision for the packet. Finally, as MPLS labeled packets leave the network, another edge router removes the labels.

In MPLS terminology, the packet handling nodes or routers are called Label Switched Routers (LSRs). MPLS routers forward packets by making switching decisions based on the MPLS label. This illustrates another of the key concepts in MPLS. Conventional IP routers contain 'routing tables' which are 'looked up' using the IP header from a packet to decide how to forward that packet. These tables are built by IP routing protocols (e.g., RIP or OSPF), which contain information in the form of IP addresses. In practice, the forwarding (IP header lookup) and control planes (generation of the routing tables) are tightly coupled. As MPLS forwarding is based on labels the (label-based) forwarding plane can be separated from the routing protocol control plane. By separating the two, each can be modified independently. With such a separation, it is not necessary to change the forwarding machinery, for example, to migrate a new routing strategy into the network.

There are two broad categories of LSR: at the edge of the network, MPLS edge routers, which are high performance packet classifiers that apply (and remove) the requisite label; and Core LSRs which are capable of processing the labeled packets at extremely high bandwidths.

MPLS label distribution protocol (LDP), resource reservation protocol traffic engineering (RSVP-TE) and other protocols are defined by the Internet Engineering Task Force ("IETF"). The definitions describe the need for protocol redundancy; however do not provide information on its implementation, which is essentially left to a vendor/manufacturer to implement for their particular application requirements. An edge router is a device that routes data between one or more local area networks (LANs) and a backbone network. An edge router is an example of an edge device and is sometimes referred to as a boundary router. An edge router is sometimes contrasted with a core router, which forwards packets to computer hosts within a network (but not between networks).

With an aggregation and core router application, failure of a protocol, can lead to an unacceptable network down time. Hardware and software redundancy can be provided to provide high network availability. The present invention, MPLS Redundancy, provides this high level of availability for network applications, which utilize MPLS protocols.

FIG. 1 is a schematic diagram of a system for implementing MPLS redundancy in a router 10 in accordance with the teachings of the present invention. Router 11 includes active MPLS control card 12. Active MPLS control card 12 performs MPLS operations, as described above. MPLS operations include for example mechanisms for labels, exchanging labeled data on label switched paths, updating best network routes to a local routing table and maintaining related timers.

Standby MPLS control card 14 is removably coupled to router 11. In the absence of standby MPLS control card 14, active MPLS control card 12 operates in a non-redundant mode. Active MPLS control card 12 communicates MPLS information 15 over communication link 16 to standby MPLS control card 14. Preferably, communication link 16 is a fast and reliable communication channel. For example, communication link 16 can be a duplex Ethernet. The same redundancy software for MPLS operations 18 runs on both active MPLS control card 12 and standby MPLS control card 14. Redundancy software for MPLS operations 18 controls updating of MPLS information 15 between active MPLS control card 12 and standby MPLS control card 14 and distinguishes between an active mode and a backup mode using system state information, as described in more detail below.

After standby MPLS control card 14 is coupled to router 11, an initial synchronization is performed for transferring initial redundancy data from running active MPLS control card 12 to standby MPLS control card 14 using redundancy software for MPLS operations 18. For example, initial redundancy data can include provisioning data and MPLS state data. After the initial synchronization, an MPLS process running in redundancy software for MPLS operations 18 operates in an incremental updating mode. Update data can be posted to active MPLS control card 12. Update data are forwarded to standby MPLS control card 14. For example, update data includes provisioning and MPLS state data Accordingly, standby MPLS control card 14 mirrors active MPLS control card 12 for implementing redundancy. In this state, referred to as hot-standby, active MPLS control card 12 and standby MPLS control card 14 maintain a substantially synchronous state. Thereafter, if a failure of active MPLS control card 12 occurs, standby MPLS control card 14 will become active and be capable of immediately taking over all operations which were previously performed by active MPLS control card 12. Active MPLS control card 12 and standby MPLS control card 14 are processors which are coupled to a line card and ASIC driver of router 11.

One embodiment of the present invention utilizes MPLS protocols running on the Nokia ASR2000 router (or alternatively the ARS2020), having both active and standby cards. The Nokia ASR2000 and ASR2020 Technical Manuals are incorporated herein by reference as if fully set out. While the present invention is particularly well suited for use with the Nokia ASR2000 and ASR2020 devices and shall be so described herein, it is equally suited for use with other routers having similar capabilities and features for implementation of MPLS redundancy. All of the MPLS protocol states are mirrored from active MPLS control card 12 to the standby MPLS control card 14, as described in detail below. Without the present invention, MPLS Redundancy, an Active card failure would result in the loss of all protocol states. This loss would require that the network would have to reestablish MPLS connections across the communication network, resulting in scaling, instability and network database convergence difficulties.

Figure 2:
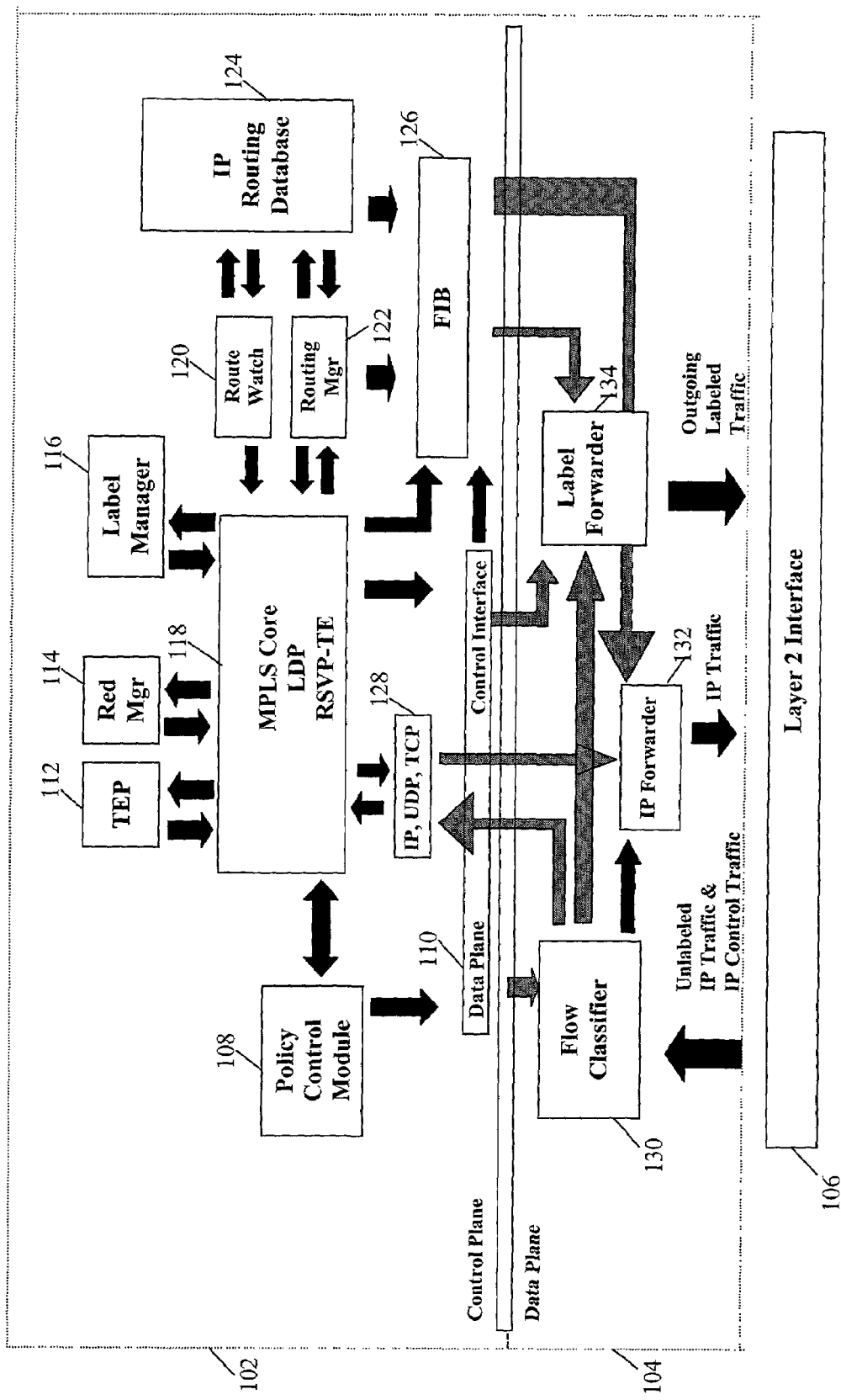
FIG. 2 is a high-level functional block diagram of the MPLS redundancy system architecture.

Referring to FIG. 2 there is shown a high-level functional block diagram of the system architecture 100 for the system for implementing MPLS redundancy in a router 10. The interaction between the various elements is represented by the series of arrows between corresponding elements. Each of active MPLS control card 12 and standby MPLS control card 14 can comprise system architecture 100. The architecture can be considered to comprise three major elements, control plane 102, data plane 104 and Layer 2 interface 106. Control plane 102 can be implemented in software and is comprised of policy control module 108, data plane control interface 110, traffic engineering process (TEP) 112, red manager 114, label manager 116, MPLS Core LDP and RSVP-TE 118, route watch 120, routing manager 122, IP routing database 124, forwarding information base (FIB) look up table 126, and IP, User Datagram Protocol ("UDP") and Transmission Control Protocol ("TCP") 128. Data plane 104 can be implemented in hardware and is comprised of a flow classifier 130, IP forwarder 132 and label forwarder 134.

Policy control module 108 controls the use of policies and protocols such as LDP and RSVP-TE. Data plane control interface 110 controls receipt and forwarding of data between control plane 102 and data plane 104. Traffic engineering process 112 is a process to create a uniform or differentiated distribution of traffic through the network. Red manager 114 implements initializing and operating a standby MPLS processor, in accordance with the teachings of the present invention. Label manager 116 manages assignment of labels to data. MPLS, LDP and RSVP-TE 118 implement MPLS functions. Route watch 120, routing manager 122 and IP routing database 124 perform MPLS routing functions. Forwarding information base (FIB) look up table 126 provides routing information which is forwarded between control plane 102 and data plane 104. IP, User Datagram Protocol ("UDP") and Transmission Control Protocol ("TCP") 128 implements the respective protocols. Flow classifier 130 receives unlabeled IP traffic and IP control traffic and forwards the traffic to IP forwarder 132, label forwarder 134 and data control interface 110. Label forwarder 134 forwards outgoing labeled traffic. IP forwarder 132 forwards outgoing IP traffic. It will be appreciated that policy control module 108, data plane control interface 110, traffic engineering process (TEP) 112, label manager 116, MPLS Core LDP and RSVP-TE 118, route watch 120, routing manager 122, IP routing database 124, forwarding information base (FIB) look up table 126, and IP, User Datagram Protocol ("UDP") and Transmission Control Protocol ("TCP") 128 implement conventional functions of MPLS.

The MPLS protocols are composed of events and states, which are specified in various IETF drafts. Events fall into the following categories: external event from the peer; provisioning event from operator; failure event from hardware; and a timer event. The external event from the peer, provisioning event from operator, failure event from hardware, and timer events only occur at active MPLS control card 12. At standby MPLS control card 14, the external event from the peer, provisioning event from operator, failure event from hardware events are "learned" from the active MPLS control card 12, as update messages. The timer event at standby MPLS control card 14 is blocked. A finite state machine of the MPLS is implemented in active MPLS control card 12 and standby MPLS control card 14 for processing the events and transits to a next state. Only active MPLS control card 12 sends an external event to the peer in the network. A standby update mechanism is used to mirror the finite state machine of active MPLS control card 12 onto standby MPLS control card 14.

Figure 3:
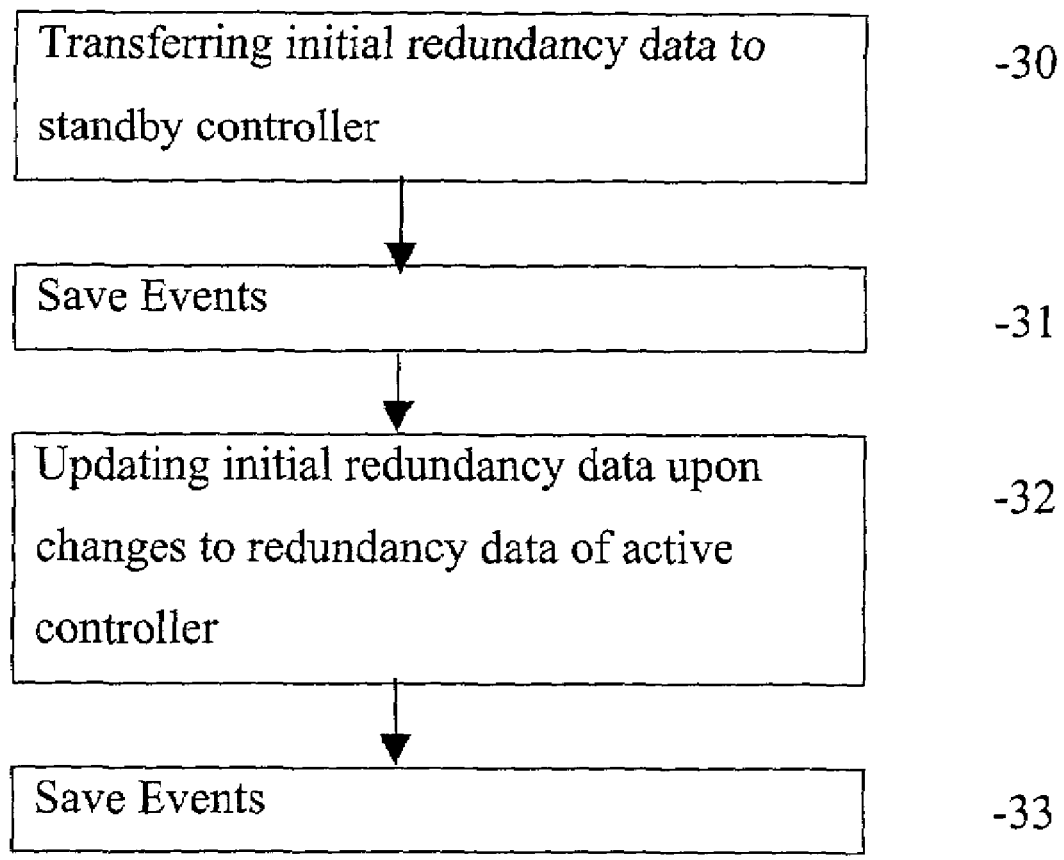
FIG. 3 is a flow diagram of steps for transfer of protocol information from an active process to a standby process.

FIG. 3 is a flow diagram of steps for initializing and operating of the update mechanism. In block 30, initial redundancy information data is transferred from an operating active MPLS control card 12 to standby MPLS control card 14 which is inserted in router 11 and is coupled to active MPLS control card 12. For example, initial redundancy information can be transferred as a bulk update.

In block 31, all events of the initial redundancy information data are saved in memory. In block 32, standby updates are sent when the external event from the peer, provisioning event from operator, failure event from hardware events are processed at active MPLS control card 12 in order to inform standby MPLS control card 14 and to maintain both the finite state machines of active MPLS control card 12 and standby MPLS control card 14 in-synchronization. In block 34, updated events are saved in memory. Events are saved in memory in block 31 and block 33 in order to handle the remote case where standby MPLS control card 14 may fail, or is yanked-out/yanked-in from active MPLS control card 12. In this situation, when standby MPLS control card 14 is restarted all stored events saved in block 31 and block 33 are sent as a bulk-update to standby MPLS control card 14.

In one representative embodiment of the present invention, MPLS Redundancy, is implemented with two software modules, which are contained within red manager 114. A representative implementation of one module, the mplsRedNode follows:

```
* File Name: mplsKey.h * Module Name: MPLS
* Description: All MPLS redundancy has table related declarations
* Compilation Notes: NONE
* Revision History
* Modifying key to use hash functions to be used by bulk update
*/
#ifndef_MPLS_RED_NODE_H
#define_MPLS RED NODE H
#define MPLS_RED_ADMIN_OFF    0
#define MPLS_RED_ADMIN_ON     1
#define MPLS_REDUNDANCY_DISABLE( )\
   gMplsRedNode.admin_state = MPLS_RED_ADMIN_OFF; \
   gMplsRedNode.state = MPLS_RED_NOT_REDUNDANT_STATE;
typedef struct mpls_red_node
{
   APOOL_ID updMsgPoolId;        /* pool id for
                                    mpls_sb_upd_msg pool */
   APOOL ID updSbMsgPoolId;      /* pool id for
                                    mpls_sb_upd_msg pool */
   APOOL ID htNodePoolId;        /* pool id for
                                    mpls_sb_upd_msg pool */
   UINT32 peerIpcId;             /* ipc id of the mplsMgr i n SB */
   UINT32 redSessionId;          /* redundancy session id */
   UINT32 useMplsPools;          /* flag to use pool or not */
   UINT32 state;                    /* redundancy state */
   UINT32 admin_state;              /* redundancy admin state */
   UINT32 bulkUpdate;
   /* flag indicating whether bulk update is happening */
   UINT32 nBulkUpdatesStarted;   /* Number of bulk updates
                                    started */
   UINT32 nBulkUpdatesFailed;    /* Number of bulk updates
                                    failed */
   UINT32 nBulkUpdatesSucceeded; /* Number of bulk updates
                                    passed */
   UINT32 newUpdatesInserted;
   /* indicates if new updates have been inserted while
```

-continued

```
bulk update was in progress */
UINT32 lastHtEntryIndexVisited;
/* last visited hask index of the hash table during bulk update */
UINT32 nBulkScans;
/* number of time we scan the hash table during bulk update */
UINT32 maxCQSize;
/* Maximum size of circular queue */
NOKIA-CQUEUE-PTR sbUpdsCQP; /* Circular queue pointer */
MPLS_RED_DEBUG_4ACTIVE_T cnt4Act;    /* Counters at active
                                        */
MPLS_RED_DEBUG_4STANDBY_T cnt4Sb;  /* Counters at
                                       standby */
} MPLS_RED_NODE;
extern MPLS_RED_NODE gMplsRedNode;
#endifMPLS_RED_NODE_H
```

A representative implementation of the second module, mplsRedProtocH follows:
STATUS mplsRedInit(void);
STATUS mplsRedSbUpdHdlr(MPLS_SB_UPD_MSG* sbUpd);
STATUS mplsRed_allocatePools(void);
void mplsRedProcSbUpdCQ(void);
void mplsRedStartBulkUpdate(void); STATUS mplsRedProcIncrUpdMsgAtActive(MPLS_SB_UPD_MSG *pSbUpd, int size);
int mplsCardStatus(void);
void mplsRedSynchronizeAll(void);
STATUS mplsRedUpdateBulkTbl(MPLS_SB_UPD_MSG *updMsg); STATUS mplsRedStandbyToActive(void);
UINT32 mplsRedGetState(void);
STATUS mplsProcEnqueuedAndDeletedNode (MPLS_SB_UPD_NODE *sbNode);
void mplsRed shSbUpdBmSyncMsg(MPLS_SB_UPD_MSG *sbMsg);
void mplsRedChangeState (int newstate);
void mplsRed-shSbUpdNode(MPLS_SB_UPD_NODE *sbNode,int flag);
STATUS mplsDeleteSbUpdMsg(MPLS_SB_UPD_MSG *sbUpdMsg);
MPLS_SB_UPD_MSG *mplsCreateSbUpdMsg(void);
STATUS mplsDeleteSbUpdNode(MPLS_SB_UPD_NODE *node);
MPLS_SB_UPD_NODE *mplsCreateSbUpdNode(void);
void mplsRed shSbUpdBmSyncMsg(MPLS_SB_UPD_MSG *sbMsg);
void mplsStdbyCQCleanup( );
void mplsStdbyProcessBackground(void);
void mplsSetAllDebug( );
void mplsSetRedDebug( );
void mplsClearAllDebug( );
uns8 mapMplsMgrToHJMsgType (MPLS-SB-UPD-TYPE msgType);
void mplsManageKeys (uns16 tunnelId, uns32 extTunnelId, uns8 msgType,
   HJ_IP_INDICATION_INFO *ip_info,
   MPLS_SB_UPD_MSG *mplsStandbyMsg);
void mplsLabelProcAtSBForBulkUpdate (MPLS_SB_UPD_MSG *pSbUpd);
void mplsRed_shSbUpdSigMsg(MPLS_SB_UPD_MSG *sbMsg,int flag);
STATUS mplsIncrPathMsgCounter (MPLS_TRACK_PATH_MSG *mplsTrackPathM sg);
STATUS mplsDecrPathMsgCounter (MPLS_TRACK_PATH_MSG *mplsTrackPathM sg);
UINT32 mplsGetPathMsgCounter (MPLS_TRACK_PATH_MSG *mplsTrackPathMs g);
void mplsRed_shSbUpdBulkStartMsg (MPLS_SB_UPD_MSG *sbMsg);
STATUS mplsSendBulkStartMsgToStdby (void);
void mplsRed_shCliMsg(MPLS_SB_UPD_MSG *sbMsg, int flag);
void mplsRed_clearCntrsActive (void);
void mplsRed_clearCntrsSB (void);
void mplsRed_clearBulkCntrsActive (void);
void mplsRed_clearBulkCntrsSB (void);
BOOLEAN isSignalingMesg (MPLS_SB_UPD_TYPE type);

In view of the foregoing description, numerous modifications and alternative embodiments of the invention will be apparent to those skilled in the art. It should be clearly understood that the particular exemplary computer code can be implemented in a variety of ways in a variety of languages, which are equally well suited for a variety of hardware platforms. Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claim, is reserved.

What is claimed is:

1. An MPLS redundancy method comprising the steps of:
   providing a router having an active processor;
   coupling a standby processor to said active processor;
   forwarding protocol information from said active processor to said standby processor for synchronizing protocol states of said active processor at said standby processor upon coupling of said active processor to said standby processor, wherein the protocol information is forwarded immediately upon the coupling of said active processor to said standby processor; and
   switching said router to said standby processor when a failure is detected at said active processor,
   wherein all states of said protocol immediately function as if the failure had not occurred.

2. The method of claim 1, wherein said protocol information is initial redundancy information data.

3. The method of claim 2, wherein said initial redundancy information data is forwarded to said standby processor as a bulk update.

4. The method of claim 2, further comprising the step of: storing said initial redundancy information data.

5. The method of claim 1, further comprising the steps of:
   updating said protocol information at said active processor; and
   forwarding said updated protocol information to said standby processor.

6. The method of claim 5, further comprising the step of: storing said updated protocol information.

7. The method of claim 1, wherein said step of forwarding protocol information includes forwarding an external event from the peer of said active processor.

8. The method of claim 1, wherein said step of forwarding protocol information includes forwarding a provisioning event from operator of said active processor.

9. The method of claim 1, wherein said step of forwarding protocol information includes forwarding a failure event from hardware information of said active processor.

10. The method of claim 1, wherein said step of forwarding protocol information includes forwarding state information.

11. The system of claim 1, wherein said protocol information is initial redundancy information data.

12. The system of claim 11, wherein said means for forwarding information forward said initial redundancy information data to said standby processor as a bulk update.

13. The system of claim 11, further comprising:
means for storing said initial redundancy information data.

14. An MPLS protocol redundancy method comprising the steps of:
providing a router having an active processor;
coupling a standby processor to said active processor;
forwarding network MPLS protocol information from said active processor to said standby processor immediately upon the coupling of the standby processor to said active processor, for synchronizing MPLS protocol states of said active processor at said standby processor; and
switching said router to said standby processor when a failure is detected at said active processor;
wherein all states of said MPLS protocol immediately function as if the failure had not occurred.

15. A routing protocol redundancy method comprising the steps of:
providing a router having an active processor;
coupling a standby processor to said active processor;
forwarding MPLS protocol information from said active processor to said standby processor immediately upon coupling the standby processor to said active processor, for synchronizing link configuration and link protocol states of said active processor at said standby processor, said MPLS protocol information is selected from one or more of an external event from the peer, a provisioning event from operator and a failure event from hardware; and
switching said router to said standby processor when a failure is detected at said active processor;
wherein all states of said link protocol immediately function as if the failure had not occurred.

16. A system for MPLS redundancy comprising:
an active processor;
a standby processor;
means for forwarding protocol information from said active processor to said standby processor for synchronizing protocol states of said active processor at said standby processor immediately upon coupling of said active processor to said standby processor; and
means for switching said router to said standby processor when a failure is detected at said active processor,
wherein all states of said protocol immediately function as if the failure had not occurred.

17. The system of claim 16, further comprising:
means for updating said protocol information at said active processor; and
means for forwarding said updated protocol information to said standby processor.

18. The system of claim 17, further comprising:
means for storing said updated protocol information.

19. The system of claim 16, wherein said forwarding protocol information is an external event from the peer of said active processor.

20. The system of claim 16, wherein said forwarding protocol information is a provisioning event from operator of said active processor.

21. The system of claim 16, wherein said forwarding protocol information is a failure event from hardware information of said active processor.

22. The system of claim 16, wherein said forwarding protocol information is state information.

23. The system of claim 16, wherein said active processor is an active MPLS control card.

24. The system of claim 16, wherein said standby processor is a standby MPLS control card.

25. An MPLS protocol redundancy system comprising:
an active processor;
a standby processor coupled to said active processor;
means for forwarding network MPLS protocol information from said active processor to said standby processor for synchronizing MPLS protocol states of said active processor at said standby processor, wherein said network MPLS information is forwarded immediately upon coupling of the standby processor to said active processor; and
means for switching said router to said standby processor when a failure is detected at said active processor;
wherein all states of said MPLS protocol immediately function as if the failure had not occurred.

26. A routing protocol redundancy system comprising:
a router having an active processor;
a standby processor coupled to said active processor;
means for forwarding MPLS protocol information from said active processor to said standby processor immediately upon coupling of said standby processor to said active processor, for synchronizing link configuration and link protocol states of said active processor at said standby processor, said MPLS protocol information is selected from one or more of an external event from a peer, a provisioning event from operator and a failure event from hardware; and
means for switching said router to said standby processor when a failure is detected at said active processor;
wherein all states of said link protocol immediately function as if the failure had not occurred.

27. An MPLS protocol redundancy system comprising:
a router having an active processor and a standby processor, wherein the standby processor is coupled to the active processor;
means for forwarding network MPLS protocol information from said active processor to said standby processor for synchronizing MPLS protocol states of said active processor at said standby processor, wherein the MPLS protocol information is forwarded immediately upon the coupling of said standby processor to said active processor; and
means for switching said router to said standby processor when a failure is detected at said active processor,
wherein all states of said MPLS protocol immediately function as if the failure had not occurred.

* * * * *

UNITED STATES PATENT AND TRADEMARK OFFICE
CERTIFICATE OF CORRECTION

PATENT NO. : 7,093,160 B2
APPLICATION NO. : 10/139065
DATED : August 15, 2006
INVENTOR(S) : Lau et al.

It is certified that error appears in the above-identified patent and that said Letters Patent is hereby corrected as shown below:

On the Title Page item (75):

The residence city of the first inventor should read:

-- Cupertino --

The name of the last inventor should read:

-- Bobby Vandalore --

Signed and Sealed this

Fifth Day of December, 2006

JON W. DUDAS
*Director of the United States Patent and Trademark Office*